United States Patent
Hux

(10) Patent No.: US 6,867,773 B2
(45) Date of Patent: Mar. 15, 2005

(54) GENERATING SURFACE NORMALS

(75) Inventor: William A. Hux, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 312 days.

(21) Appl. No.: 10/145,265

(22) Filed: May 13, 2002

(65) Prior Publication Data

US 2003/0210243 A1 Nov. 13, 2003

(51) Int. Cl.$^7$ ............................................. G06T 17/00
(52) U.S. Cl. ...................... 345/424; 345/419; 345/420; 345/427; 345/421; 382/154; 382/205
(58) Field of Search ............................... 345/419, 420, 345/421, 424, 427; 382/154, 205

(56) References Cited

U.S. PATENT DOCUMENTS

| | | | |
|---|---|---|---|
| 5,442,733 A | * | 8/1995 | Kaufman et al. ........... 345/424 |
| 5,898,793 A | * | 4/1999 | Karron et al. .............. 382/131 |
| 6,342,886 B1 | * | 1/2002 | Pfister et al. ............... 345/424 |
| 6,556,199 B1 | | 4/2003 | Fang et al. |

OTHER PUBLICATIONS

"Marching Cubes: A High Resolution 3D Surface Construction Algorithm"; William E. Lorensen, Harvey E. Cline; Computer Graphics; Siggraph '87 Conference Proceedings; Jul. 27–31, 1987; vol. 21, No. 4; ACM Siggraph; pp. 163–169.

"Rapid Octree Construction from Image Sequences"; Richard Szeliski; Image Understanding; ISSN 1049–9660; vol. 58, No. 1, Jul. 1993; Academic Press, Inc.; pp. 23–32.

"Surface reconstruction from Unorganized Points"; Hugues Hoppe et al.; Computer Graphics Proceedings; Siggraph '92; vol. 26, No. 2, Jul. 1992; pp. 71–78.

Automatic Reconstruction of 3D Objects Using a mobile Monoscopic Camera; W. Niem, et al.; Proceedings International Conference on Recent Advances in 3–D Digital Imaging and Modeling; May 12–15, 1997; National Research Council Canada; pp. 173–180.

\* cited by examiner

Primary Examiner—Kimbinh T. Nguyen
(74) Attorney, Agent, or Firm—Fish & Richardson P.C.

(57) ABSTRACT

A method of determining neighboring voxels that contribute to a surface of an object includes evaluating a primary voxel that corresponds to a side of a reference voxel. The side of the reference voxel is adjacent to an outside voxel, which is outside the object. The primary voxel is adjacent to the outside voxel and is adjacent to a corresponding secondary voxel. The secondary voxel is age adjacent to a corresponding tertiary voxel. The method also includes determining whether the primary voxel, the secondary voxel or the tertiary voxel is on the same surface as the reference voxel.

30 Claims, 7 Drawing Sheets

GENERATING SURFACE NORMALS

TECHNICAL FIELD

This disclosure relates to three-dimensional (3D) graphics and, in particular, to generating surface normals.

BACKGROUND

A two-dimensional area (2D) can be divided into square units called pixels. Likewise, a 3D volume can be divided into cubical units called voxels. In much the same way that a camera can be used to create a 2D pixel representation of a real-world object by taking a picture, a 3D voxel representation of a real-world object can be constructed by taking many pictures of an object from different angles. Other techniques for generating a 3D voxel representation include using laser range-finding techniques. Determining the surface normals in conjunction with other known techniques can be used to construct meshes. In addition, surface normals can also be used to determine the lighting of an object.

DESCRIPTION

Figure 1:
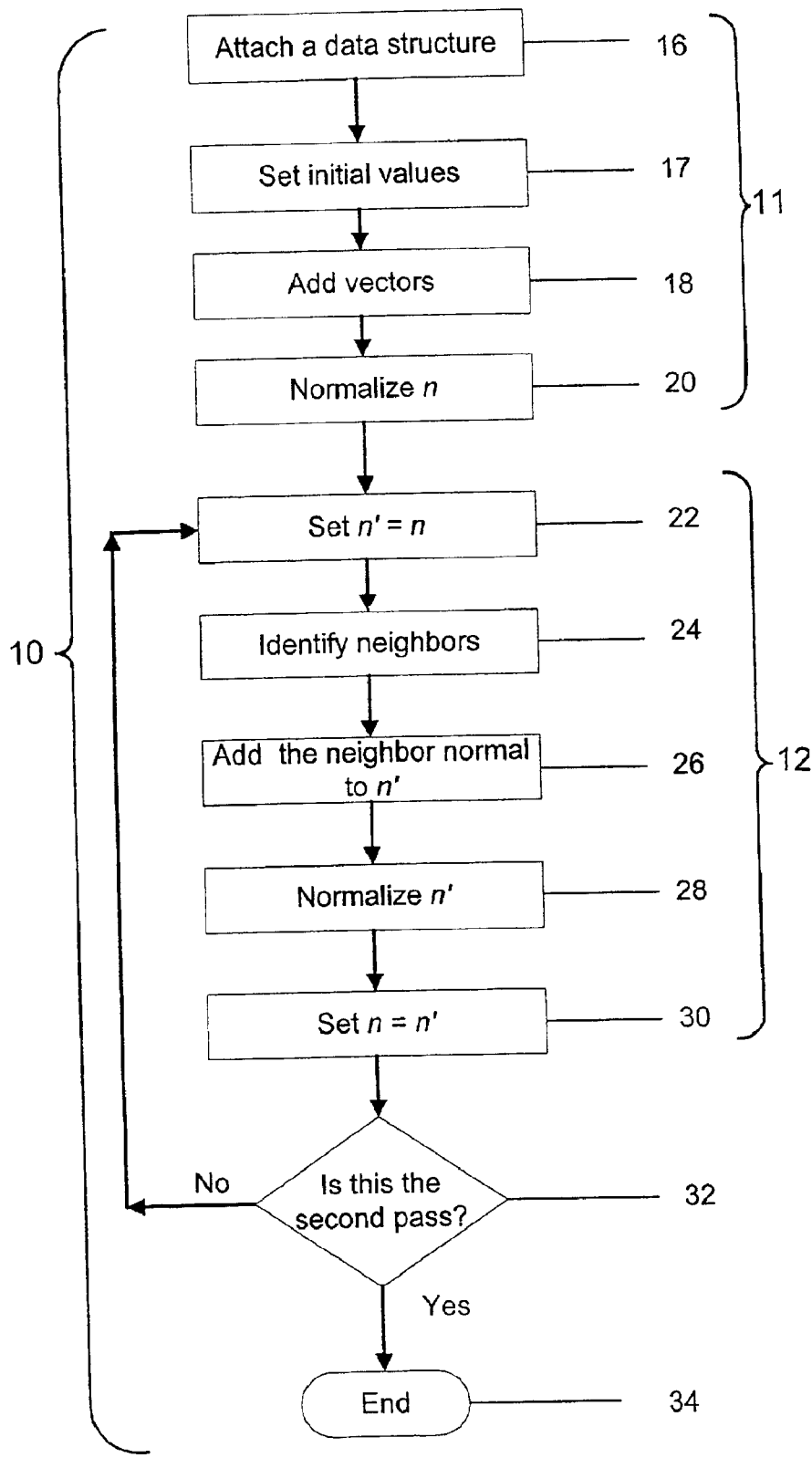
FIG. 1 is a flowchart of a process to generate surface normals.
Figure 2:
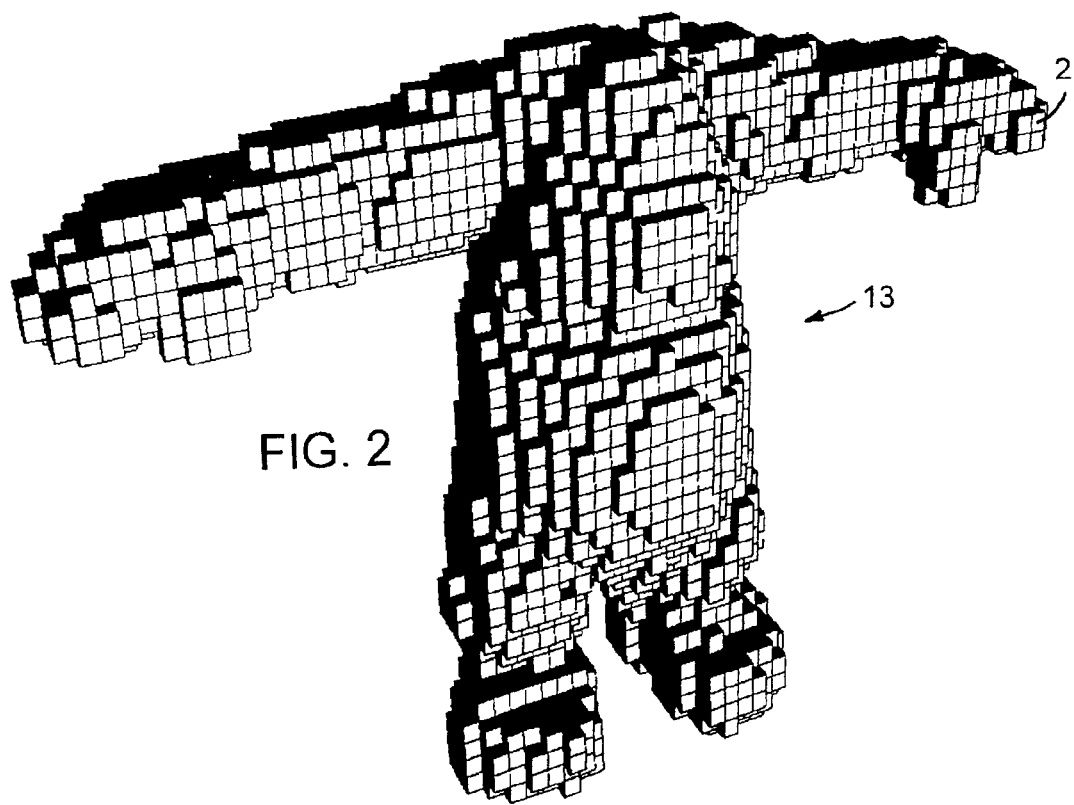
FIG. 2 is a voxel representation of a humanoid prior to using the process in FIG. 1.

Referring to FIGS. 1 and 2, process 10 determines the surface normals in a voxel representation. The voxel representation contains cubically shaped voxels that are labeled either an "inside" voxel or an "outside" voxel. The "inside" voxels are inside a surface of the real-world object. The "outside" voxels are outside the surface of the real-world object. For example, a humanoid representation 13 has inside voxels 2 and outside voxels (not shown). Inside voxels 2 are depicted in FIG. 2 as gray cubes while the outside voxels are invisible. When a side of inside voxel 2 is adjacent to the outside voxel, that side is exposed. Thus, in FIG. 2, all the inside cubes that are visible have at least one exposed surface. Process 10 analyzes the exposed sides of the inside voxel cube and takes an initial guess about the surface orientation using a subprocess 11. Then, process 10 uses voxel morph operators to average the orientations of the voxel cube's neighboring voxels using a subprocess 12.

Figure 3:
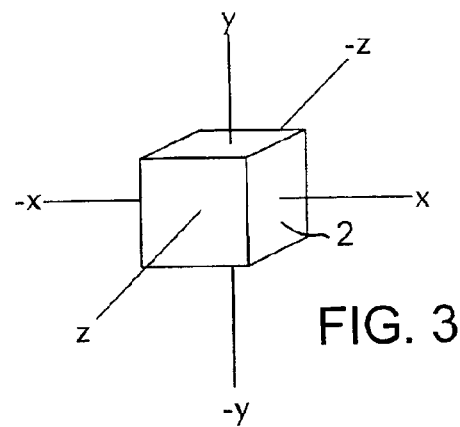
FIG. 3 is a diagram of six directions with respect to a voxel.
Figure 4:
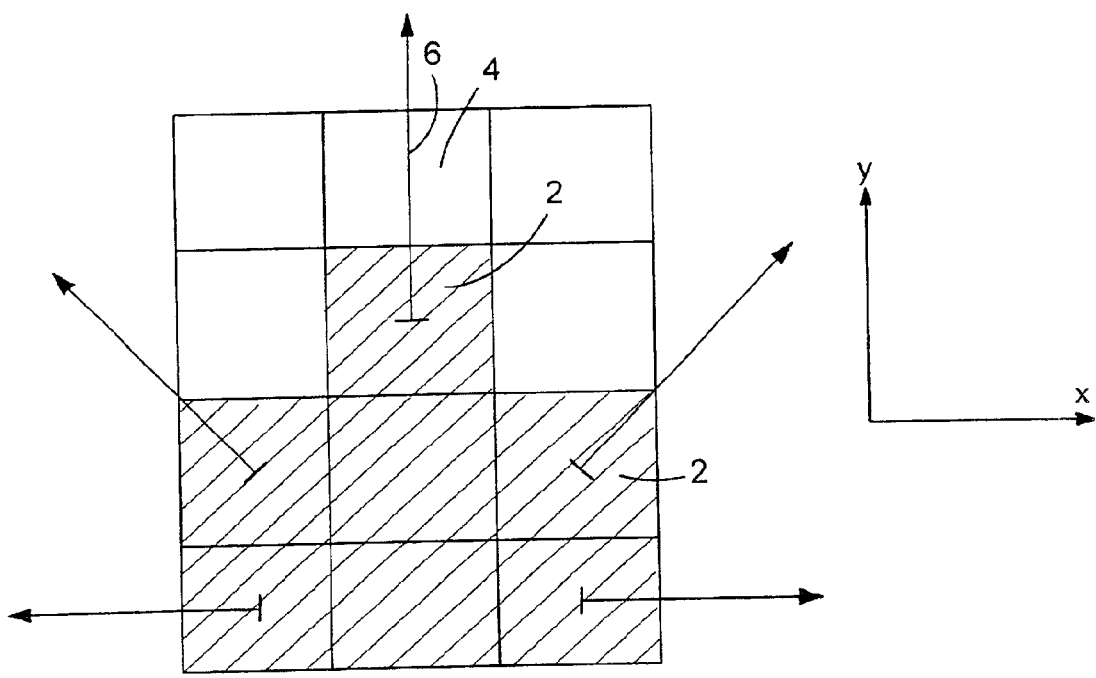
FIG. 4 is a diagram of normals to a surface.

Referring to FIGS. 3 and 4, subprocess 11 attaches (16) to each inside voxel that is adjacent to an outside voxel a data structure containing two three-value vectors, which represent the normal to the surface of the inside voxel, n, and a temporary vector, n'. Subprocess 11 sets (17) the initial value of n and n' each to be (0,0,0). Consider that each side of an inside voxel 2 represents a direction so that there are six directions such as x, −x, y, −y, z and −z directions. Subprocess 11 adds (18) to n any vector pointing in the direction of an outside voxel. For example, if there is an outside voxel 4 in the y direction, subprocess 11 adds a (0,1,0) vector 6 to n. Subprocess 11 normalizes (20) n.

Figure 5:
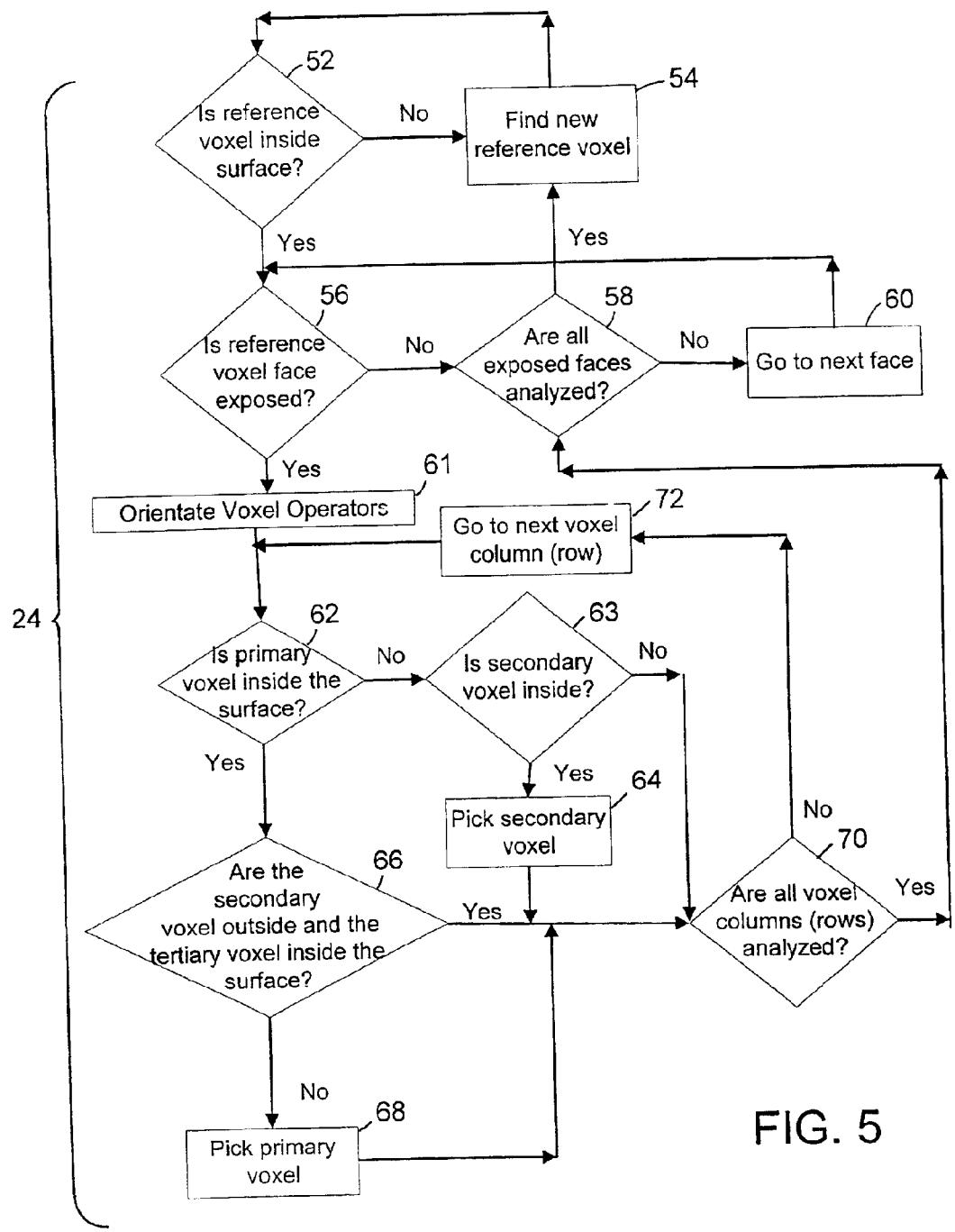
FIG. 5 is a flowchart for a process to identify voxels in the same surface as a reference voxel.

Subprocess 12 sets (22) n' equal to n. Subprocess 12 evaluates inside voxels that are adjacent to at least one outside voxel. The inside voxels are evaluated one-at-a-time so that when an inside voxel is being evaluated it is called a reference voxel. Subprocess 12 identifies (24) in each of the six directions, which voxels neighboring the reference voxel contribute to the same surface of the reference voxel. An exemplary implementation for identifying (24) neighboring voxels that are on the same surface as the reference voxel is shown in detail in FIG. 5.

Process 24 determines (52) if the reference voxel is an inside voxel. If the reference voxel is not an inside voxel, process 24 finds (54) the next reference voxel. If the reference voxel is an inside voxel, then starting in one of the six directions, process 24 determines (56) if the side has an exposed face (i.e., adjacent to an outside voxel).

If the side is not an exposed face, process 24 determines (58) if all exposed sides (faces) of the reference voxel have been checked. If not, process 24 goes (60) to the next side of the reference voxel. If all exposed sides of the reference voxel have been analyzed, process 24 finds (54) a new reference voxel.

If the reference voxel has an exposed face, then process 24 determines which voxels adjacent to the reference voxel contribute to the same surface as the reference voxel. Process 24 uses voxel morph operators, such as those described below, to make this determination.

Figure 6A:
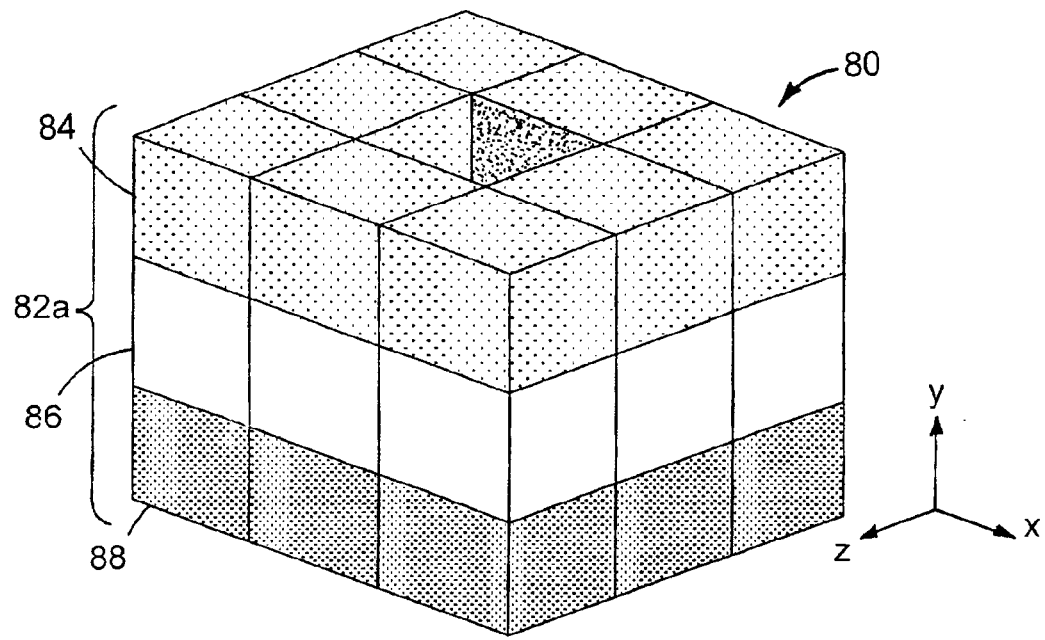
FIG. 6A is a view of a voxel operator in the y-direction.
Figure 6B:
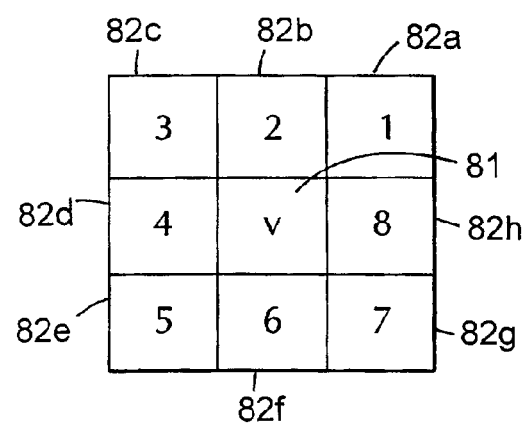
FIG. 6B is a top view of the voxel operator.

Referring to FIGS. 6A and 6B, to understand voxel morph operators, consider a reference voxel 81 (FIG. 6B) located in the center of a three by three by three (3×3×3) cube 80. Also, assume that the voxel (not shown) above (y-direction) and adjacent to reference voxel 81 is an outside voxel and therefore 3×3×3 cube 80 is in a y-operator position. In the y-operator position, the voxel above reference voxel 81 and the voxel below the reference voxel are then ignored. Thus, 3×3×3 cube 80 includes eight columns 82 (e.g., voxel column 82a, voxel column 82b, voxel column 82c, voxel column 82d, voxel column 82e, voxel column 82f, voxel column 82g and voxel column 82h) of three voxels each and reference voxel 81 in the center of the 3×3×3 cube. Each column 82 has a primary voxel 84 on top, a secondary voxel 86 in the middle and a tertiary voxel 88 on the bottom. Process 24 analyzes the eight columns 82 of voxels one at a time in a counterclockwise fashion to determine which of the three voxels (primary voxel 84, secondary voxel 86, and tertiary voxel 88) in column 82 are on the same surface as reference voxel 81.

If the next exposed face to be analyzed were in the x-direction, 3×3×3 cube 80, excluding the reference voxel, would rotate so that the primary voxels are facing the x-direction. What rotates is not the actual voxel themselves, but the voxel operators or what is designated as a primary voxel, secondary voxel and a tertiary voxel. Therefore, instead of having columns of voxels to analyze, there would be rows. In other words a voxel that is a primary voxel in one direction, may be a tertiary voxel in another direction.

Referring back to FIG. 5, after determining that a reference voxel is exposed, process 24 orientates the voxel operators. Process 24 determines (62) if the primary voxel is an inside voxel. If it is not, process 24 determines (63) if the secondary voxel is inside the surface. If the secondary voxel is inside the surface, process 24 picks (64) the secondary voxel. If primary voxel 84 is an inside voxel, process 24 determines (66) if the secondary voxel 86 is an outside voxel and the tertiary voxel 88 is an inside voxel. If secondary voxel 86 is an outside voxel and tertiary voxel 88 is an inside voxel, process 24 does not pick any voxel. If secondary voxel 86 is not an outside voxel or tertiary voxel 88 is not an inside voxel, process 24 picks (68) the primary voxel.

After a column of voxels (or rows depending on the orientation of the voxel operators) has been analyzed, process 24 determines (70) if all eight voxel columns have been analyzed. If all eight columns have been analyzed, process 24 determines (58) if there are any more exposed faces left to be analyzed. If more columns remain, process 24 (72) goes to the next column. Every time a voxel is picked by subprocess 24, it is tagged as a contributing neighbor to the reference voxel.

Referring back to FIG. 1, subprocess 12 adds (26) the tagged neighbor normals to n'. Subprocess 12 normalizes (28) n'. For each inside voxel that is adjacent to an outside voxel, process 12 sets (30) n equal to n'.

Process 10 determines (32) if subprocess 12 has completed two passes. If two passes have not been completed, subprocess 12 is repeated. If two passes have been completed, process 10 is terminated (34). In other embodiments, process 10 passes through subprocess 12 once. In still other embodiments, process 10 passes through subprocess 12 three times.

Figures 7A, 7B, 7C:
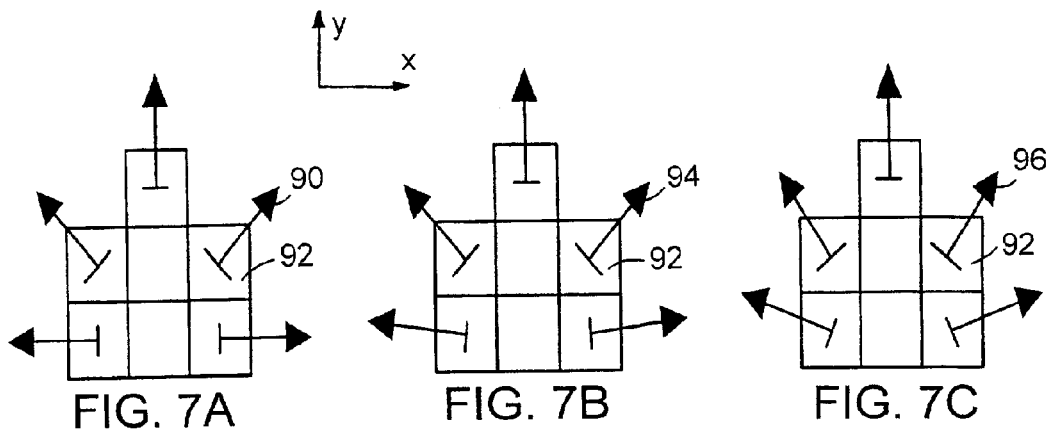
FIG. 7A is a two-dimensional diagram depicting normals to a surface of an object after an initial guess.
FIG. 7B is a diagram depicting normals to the surface of the object after using a subprocess of the process in FIG. 1 once.
FIG. 7C is a diagram depicting normals to the surface of the object after using the subprocess of the process in FIG. 1 twice.

The result of the subprocess 11 is an initial guess of normals 90 for voxels 92 having exposed faces as shown in FIG. 7A. Normals 90 are modified to form normals 94 as shown in FIG. 7B after one pass through subprocess 12. Normals 94 are modified to form normals 96 as shown in FIG. 7C after a second pass through subprocess 12.

Figure 8:
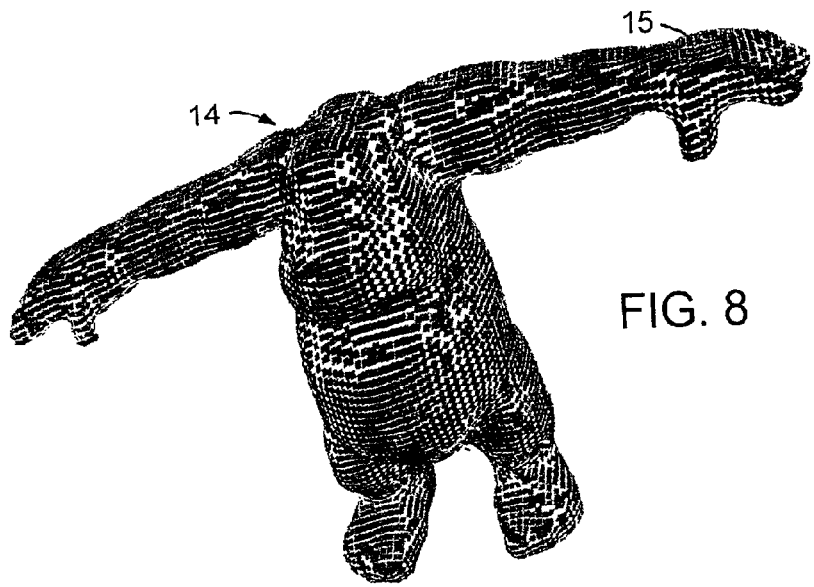
FIG. 8 is a depiction of the humanoid of FIG. 2 after using the process of FIG. 1.
Figure 9:
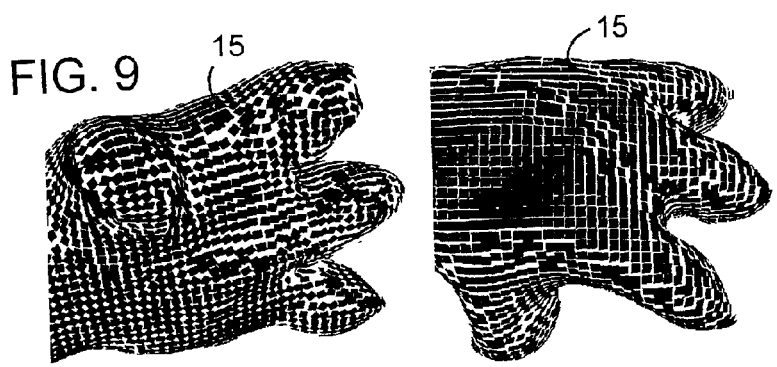
FIG. 9 is a depiction of two hands of the humanoid in FIG. 6.

Referring to FIGS. 8 and 9, the result of process 10 has each voxel having a corresponding three-value vector describing its normal in 3D space. This normal can be considered to be a reasonable approximation of the surface orientation near the center of the voxel. The voxels are reoriented to produce a smooth surface such as that shown in FIG. 8. Thus, process 10 forms a smooth approximation of the surface orientation at each point. An example of a humanoid mesh 14 of the voxel representation 11 that has been smoothed by process 10 is shown in FIG. 8. Both sides of a left hand 15 of humanoid mesh 14 are also shown in FIG. 9.

Figure 10:
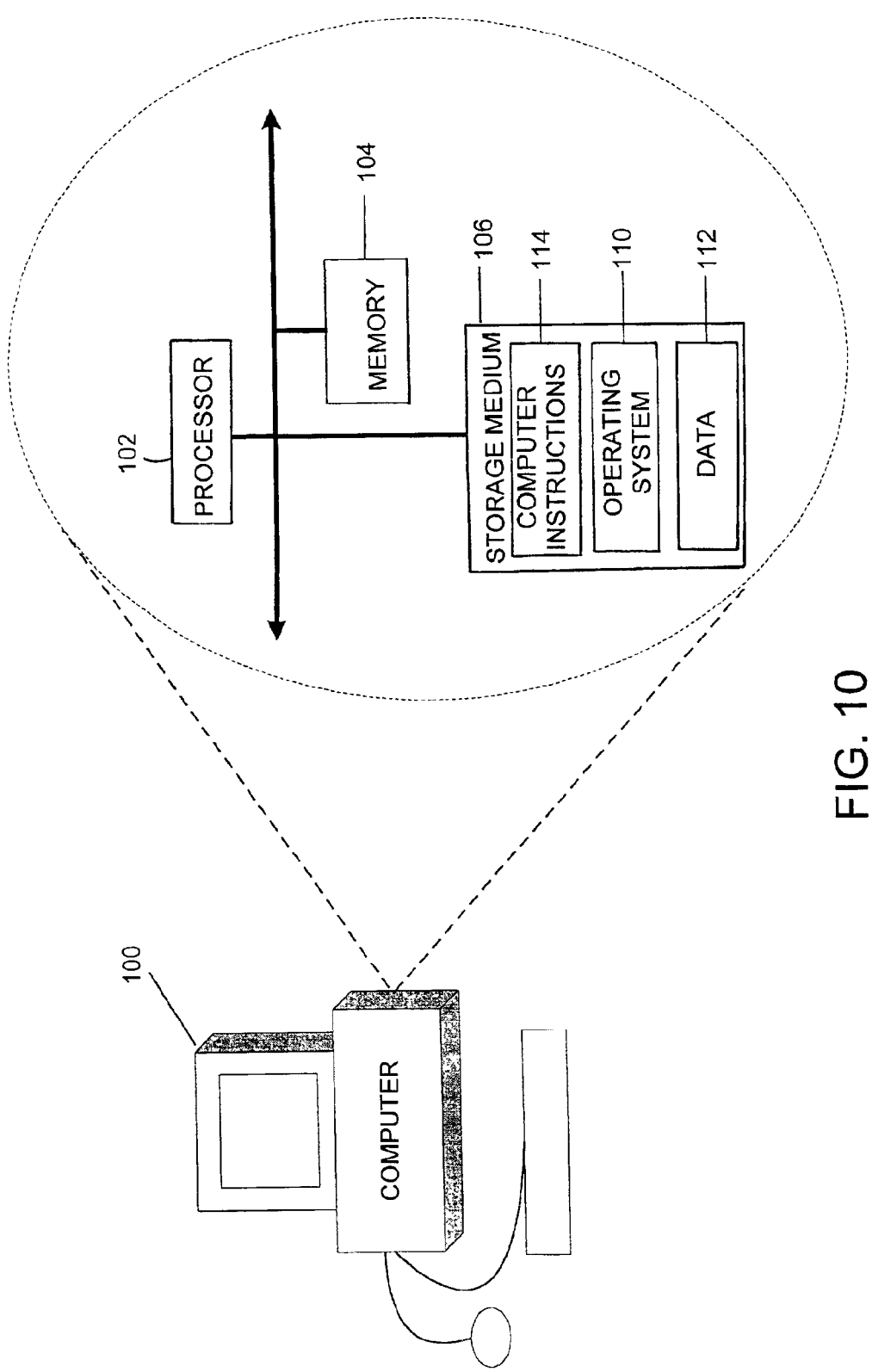
FIG. 10 is a block diagram of a computer system on which the process of FIG. 1 may be implemented.

FIG. 10 shows a computer 100 using process 10. Computer 100 includes a processor 102, a memory 104, an a storage medium 106 (e.g., hard disk). Storage medium 106 stores operating system 110, data 112 for voxel normals and temporary voxel normals, and computer instructions 114 which are executed by processor 102 out of memory 104 to perform process 10.

Process 10 is not limited to use with the hardware and software of FIG. 10; it may find applicability in any computing or processing environment and with any type of machine that is capable of running a computer program. Process 10 may be implemented in hardware, software, or a combination of the two. Process 10 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform process 10 and to generate output information.

Each such program may be implemented in a high level procedural or object-oriented programming language to communicate with a computer system. However, the programs can be implemented in assembly or machine language. The language may be a compiled or an interpreted language. Each computer program may be stored on a storage medium or device (e.g., CD-ROM, hard disk, or magnetic diskette) that is readable by a general or special purpose programmable computer for configuring and operating the computer when the storage medium or device is read by the computer to perform process 10. Process 10 may also be implemented as a machine-readable storage medium, configured with a computer program, where upon execution, instructions in the computer program cause the computer to operate in accordance with process 10.

The process is not limited to the specific embodiments described herein. For example, the voxels do not need to be uniform in size nor do the voxels need to be cubical. Also, the voxel morph operators need not be in a 3×3×3 cube. For example, the voxel morph operators can be in a pyramid configuration. The process is not limited to the specific processing order of FIGS. 1 and 5. Rather, the blocks of FIGS. 1 and 5 may be re-ordered, as necessary, to achieve the results set forth above.

Other embodiments not described herein are also within the scope of the following claims.

What is claimed is:

1. A method of determining neighboring voxels that contribute to a surface of an object, comprising:
    evaluating a primary voxel corresponding to a side of a reference voxel, side of the reference voxel being adjacent to an outside voxel, the outside voxel being outside the object, the primary voxel being adjacent to the outside voxel and adjacent to a corresponding secondary voxel, the secondary voxel being adjacent to a corresponding tertiary voxel; and
    determining whether the primary voxel, the secondary voxel or the tertiary voxel is on a same surface as the reference voxel;
    wherein determining whether the primary voxel the secondary voxel or the tertiary voxel is on a same surface as the reference voxel comprises picking the primary voxel in the primary voxel is inside the surface of the object unless the corresponding secondary voxel is outside the surface of the object and the corresponding tertiary voxel is inside the surface of the object.

2. The method of claim 1, further comprising evaluating up to eight primary voxels for each side of the reference voxel that is attached to the outside voxel.

3. The method of claim 2, further comprising using a three by three by three (3×3×3) volume of voxels to include the eight primary voxels, the corresponding eight secondary voxels, and the corresponding eight tertiary voxels, the reference voxel being in the center of the 3×3×3 volume.

4. The method of claim 1, wherein determining whether the primary voxel, the secondary voxel or the tertiary voxel is on a same surface as reference voxel comprises picking the secondary voxel if the primary voxel is outside the surface of the object and the secondary voxel is inside the surface of the object.

5. The method of claim 1, wherein determining whether the primary voxel, the secondary voxel or the tertiary voxel is on a same surface as the reference voxel comprises picking no voxels if the corresponding secondary voxel is outside the surface of the object and the corresponding tertiary voxel is inside the surface of the object.

6. An apparatus comprising:
   a memory that stores executable instructions for determining neighboring voxels that contribute to a surface of an object; and
   a processor that executes the instructions to:
      evaluate a primary voxel corresponding to a side of a reference voxel, the side of the reference voxel being adjacent to an outside voxel, the outside voxel being outside the object, the primary voxel being adjacent to the outside voxel and adjacent to a corresponding secondary voxel, the secondary voxel being adjacent to a corresponding tertiary voxel; and
      determine whether the primary voxel, the secondary voxel or the tertiary voxel is on a same surface as the reference voxel;
      wherein determining whether the primary voxel, the secondary voxel or the tertiary voxel is on a same surface as the reference voxel comprises picking the primary voxel if the primary voxel is inside the surface of the object unless the corresponding secondary voxel is outside the surface of the object and the corresponding voxel is inside the surface of the object.

7. The apparatus of claim 6, wherein the processor executes instructions to evaluate up to eight primary voxel for each side of the reference voxel that is attached to the outside voxel.

8. The apparatus of claim 7, wherein the processor executes instructions to use a three by three by three (3×3×3) volume of voxels to include the eight primary voxels, the corresponding eight secondary voxels, and the corresponding eight tertiary voxels, the reference voxel being in the center of the 3×3×3 volume.

9. The apparatus of claim 6, wherein the processor determines whether the primary voxel, the secondary voxel or the tertiary voxel is on a same surface as the reference voxel by picking the secondary voxel if the primary voxel is outside the surface of the object and the secondary voxel is inside the surface of the object.

10. The apparatus of claim 6, wherein the processor determines whether the primary voxel, the secondary voxel or the tertiary voxel is on a same surface as the reference voxel by picking no voxels if the corresponding secondary voxel is outside the surface of the object and the corresponding tertiary voxel is inside the surface of the object.

11. An article comprising a machine-readable medium that stores executable instructions for determining neighboring voxels that contribute to a surface of an object, the instructions causing a machine to:
   evaluate a primary voxel corresponding to a side of a reference voxel, the side of the reference voxel being adjacent to an outside voxel, the outside voxel being outside the object, the primary voxel being adjacent to the outside voxel and adjacent to a corresponding secondary voxel, the secondary voxel being adjacent to a corresponding tertiary voxel; and
   determine whether the primary voxel, the secondary voxel or the tertiary voxel is on a same surface as the reference voxel;
   wherein determining whether the primary voxel, the secondary voxel or the tertiary voxel is on a same surface as the reference voxel comprises picking the primary voxel the primary voxel is inside the surface of the object unless the corresponding secondary voxel is outside the surface of the object and the corresponding tertiary voxel is inside the surface of the object.

12. The article of claim 11, further comprising instructions causing the machine to evaluate up to eight primary voxels for each side of the reference voxel that is attached to the outside voxel.

13. The article of claim 12, further comprising instructions causing the machine to use a three by three by three (3×3×3) volume of voxels to include the eight primary voxels, the corresponding eight secondary voxels, and the corresponding eight tertiary voxels, the reference voxel being in the center of the 3×3×3 volume.

14. The article of claim 11, wherein instructions causing the machine to determine whether the primary voxel, the secondary voxel or the tertiary voxel is on a same surface as the reference voxel comprises instructions causing a machine to pick the secondary voxel if the primary voxel is outside the surface of the object and the secondary voxel is inside the surface of the object.

15. The article of claim 11, wherein instruction causing the machine to determine whether the primary voxel, the secondary voxel or the tertiary voxel is on a same surface as the reference voxel comprises instructions causing a machine to pick no voxels if the corresponding secondary voxel is outside the surface of the object and the corresponding tertiary voxel is inside the surface of the object.

16. A method of determining neighboring voxels that contribute to a surface of an object, comprising:
   evaluating a primary voxel corresponding to a side of a reference voxel, the side of the reference voxel being adjacent to an outside voxel, the outside voxel being outside the object, the primary voxel being adjacent to the outside voxel and adjacent to a corresponding secondary voxel, the secondary voxel being adjacent to a corresponding tertiary voxel; and
   determining whether the primary voxel, the secondary voxel or the tertiary voxel is on a same surface as the reference voxel;
   wherein determining whether the primary voxel, the secondary voxel or the tertiary voxel is on a same surface as the reference voxel comprises picking the secondary voxel if the primary voxel is outside the surface of the object and the secondary voxel is inside the surface of the object.

17. The method of claim 16, further comprising evaluating up to eight primary voxels for each side of the reference voxel that is attached to the outside voxel.

18. The method of claim 17, further comprising using a three by three by three (3×3×3) volume of voxels to include the eight primary voxels, the corresponding eight secondary voxels, and the corresponding eight tertiary voxels, the reference voxel being in the center of the 3×3×3 volume.

19. The method of claim 16, wherein determining whether the primary voxel, the secondary voxel or the tertiary voxel is on a same surface as the reference voxel comprises picking the primary voxel if the primary voxel is inside the surface of the object less the corresponding secondary voxel is outside the surface of the object and the corresponding tertiary voxel is inside the surface of the object.

20. The method of claim 19, wherein determining whether the primary voxel, the secondary voxel or the tertiary voxel is on a same surface as the reference voxel comprises picking no voxels if the corresponding secondary voxel is outside the surface of the object and the corresponding tertiary voxel is inside the surface of the object.

21. An apparatus comprising:
a memory that stores executable instructions for determining neighboring voxels that contribute to a surface of an object; and
a processor that executes the instructions to:
evaluate a primary voxel corresponding to a side of a reference voxel, the side of the reference voxel being adjacent to an outside voxel, the outside voxel being outside the object, the primary voxel being adjacent to the outside voxel and adjacent to a corresponding secondary voxel, the secondary voxel being adjacent to a corresponding tertiary voxel; and
determine whether the primary voxel, the secondary voxel or the tertiary voxel is on a same surface as the reference voxel;
wherein determining whether the primary voxel, the secondary voxel or the tertiary voxel is on a same surface as the reference voxel comprises picking the secondary voxel if the primary voxel is outside the surface of the object and the secondary voxel is inside the surface of the object.

22. The apparatus of claim 21, wherein the processor executes instructions to evaluate up to eight primary voxels for each side of the reference voxel that is attached to the outside voxel; and.

23. The apparatus of claim 22, wherein the processor executes instructions to use a three by three by three (3×3×3) volume of voxels to include the eight primary voxels, the corresponding eight secondary voxels, and the corresponding eight tertiary voxel, the reference voxel being in the center of the 3×3×3 volume.

24. The apparatus of claim 21, wherein the processor determines whether the primary voxel, the secondary voxel or the tertiary voxel is on a same surface as the reference voxel by picking the primary voxel if the primary voxel is inside the surface of the object unless the corresponding secondary voxel is outside the surface of the object and the corresponding tertiary voxel is inside the surface of the object.

25. The apparatus of claim 24, wherein processor determines whether the primary voxel, the secondary voxel or the tertiary voxel is on a same surface as the reference voxel by picking no voxels if the corresponding secondary voxel is outside the surface of the object and the corresponding tertiary voxel is inside the surface of the object.

26. An article comprising a machine-readable medium that stores executable instructions for determining neighboring voxels that contribute to a surface of an object, the instructions causing a machine to:
evaluate a primary voxel corresponding to a side of a reference voxel, the side of the reference voxel being adjacent to an outside voxel, the outside voxel being outside the object, the primary voxel being adjacent to the outside voxel and adjacent to a corresponding secondary voxel, the secondary voxel being adjacent to a corresponding tertiary voxel; and
determine whether the primary voxel, the secondary voxel or the tertiary voxel is on a same surface as the reference voxel;
wherein determining whether the primary voxel, the secondary voxel or the tertiary voxel is on a same surface as the reference voxel comprises picking the secondary voxel if the primary voxel is outside the surface of the object and the secondary voxel is inside the surface of the object.

27. The article of claim 26, further comprising instructions causing the machine to evaluate up to eight primary voxels for each side of the reference voxel that is attached to the outside voxel; and.

28. The article of claim 27, further comprising instructions causing the machine to use a three by three by three (3×3×3) volume of voxels to include the eight primary voxels, the corresponding eight secondary voxels, and the corresponding eight tertiary voxels the reference voxel being in the center of the 3×3×3 volume.

29. The article of claim 26, wherein instructions causing the machine to determine whether the primary voxel, the secondary voxel or the tertiary voxel is on a same surface as the reference voxel comprises instructions causing a machine to pick the primary voxel if the primary voxel is inside the surface of the object unless the corresponding secondary voxel is outside the surface of the object and the corresponding tertiary voxel is inside the surface of the object.

30. The article of claim 26, wherein instructions causing the machine to determine whether the primary voxel, the secondary voxel or the tertiary voxel is on a same surface as the reference voxel comprises instructions causing a machine to pick no voxels if the corresponding secondary voxel is outside the surface of the object and the corresponding tertiary voxel is inside the surface of the object.

* * * * *